US008192286B2

(12) United States Patent
Dhunjishaw et al.

(10) Patent No.: US 8,192,286 B2
(45) Date of Patent: Jun. 5, 2012

(54) SYSTEM FOR SECURE TRANSFER OF ONLINE PRIVILEGES

(75) Inventors: David B. Dhunjishaw, Carlsbad, CA (US); Christopher D. Yates, San Diego, CA (US); Andrew S. Zaffron, San Diego, CA (US)

(73) Assignee: Sony Online Entertainment LLC, San Diego, CA (US)

( * ) Notice: Subject to any disclaimer, the term of this patent is extended or adjusted under 35 U.S.C. 154(b) by 1224 days.

(21) Appl. No.: 11/215,227

(22) Filed: Aug. 29, 2005

(65) Prior Publication Data

US 2006/0234795 A1 Oct. 19, 2006

Related U.S. Application Data

(60) Provisional application No. 60/673,042, filed on Apr. 19, 2005.

(51) Int. Cl.
*G06F 19/00* (2006.01)

(52) U.S. Cl. ............... 463/42; 463/40; 463/43; 705/37

(58) Field of Classification Search .......... 463/41, 463/42, 43, 40; 705/37, 52; 709/205
See application file for complete search history.

(56) References Cited

U.S. PATENT DOCUMENTS

| 5,835,896 | A | * | 11/1998 | Fisher et al. | ..... 705/37 |
| 6,119,229 | A | | 9/2000 | Martinez et al. | |
| 6,161,099 | A | * | 12/2000 | Harrington et al. | ..... 705/36 R |
| 2002/0116320 | A1 | * | 8/2002 | Nassiri | ..... 705/37 |
| 2002/0116610 | A1 | * | 8/2002 | Holmes et al. | ..... 713/156 |
| 2002/0120554 | A1 | * | 8/2002 | Vega | ..... 705/37 |
| 2003/0032476 | A1 | | 2/2003 | Walker et al. | |
| 2004/0243424 | A1 | * | 12/2004 | Jeong | ..... 705/1 |

(Continued)

FOREIGN PATENT DOCUMENTS

JP 2003010552 A * 1/2003

(Continued)

OTHER PUBLICATIONS

Nathan Pearce and Eric Schmitter, "Station Auctions Design Document," Sony Online Entertainment Inc., Version 2.00, Feb. 14, 2005.

(Continued)

*Primary Examiner* — Dmitry Suhol
*Assistant Examiner* — Brandon Gray
(74) *Attorney, Agent, or Firm* — Samuel S. Lee; Procopio, Cory, Hargreaves & Savitch LLP

(57) ABSTRACT

Methods and apparatus for transferring privileges in a computer system. In one implementation, a system for transferring online privileges includes: a game server having a network connection and storing data providing an online game and game environment; a game database connected to said game server, said game database storing data representing one or more game items, data representing a first user game account, and data representing a second user game account, said game item associated with said first user game account; an auction server having a network connection and connected to said game server though said network connections, and storing data providing an online auction for game items; and an auction database connected to said auction server, said auction database storing data representing one or more game items received from said game server, data representing a first user auction account, and data representing a second user auction account.

14 Claims, 4 Drawing Sheets

U.S. PATENT DOCUMENTS

2005/0004985 A1* 1/2005 Stochosky .................... 709/205
2005/0038707 A1 2/2005 Roever et al.
2005/0234804 A1* 10/2005 Fang et al. .................... 705/37

FOREIGN PATENT DOCUMENTS

| KR | 10-2004-0032010 A | 4/2004 |
| KR | 10-2004-0043943 A | 5/2004 |
| KR | 10-2004-0099666 A | 12/2004 |

OTHER PUBLICATIONS

Internet website http://news.com.com/Real+cash+for+virtual+goods/2100-1043_3-5566704.html?tag=st.rn.

Internet website http://news.com.com/Second+Life+membership+now+free/21001043_3-5855481.html?tag=nefd.top.

nternet website http://www.columbiahouse.com/ circa 1996 as made available on the Internet Archive (http://www.archive.org).

International Search Report and Written Opinion issued in PCT/US2005/45105, dated Aug. 8, 2007.

Castronova, E. Virtual Worlds: A First-Hand Account of Market and Society on the Cyberian Frontier. CESifo Working Paper No. 618 [online], Dec. 2001 [retrieved Apr. 18, 2007], Retrieved from the Internet: URL: <http://papers.ssm.com/sol3/papers.cfm?abstract_id=294828>.

Extended European Search Report issued in corresponding European patent application No. 05853916.4 on Jan. 20, 2010.

* cited by examiner

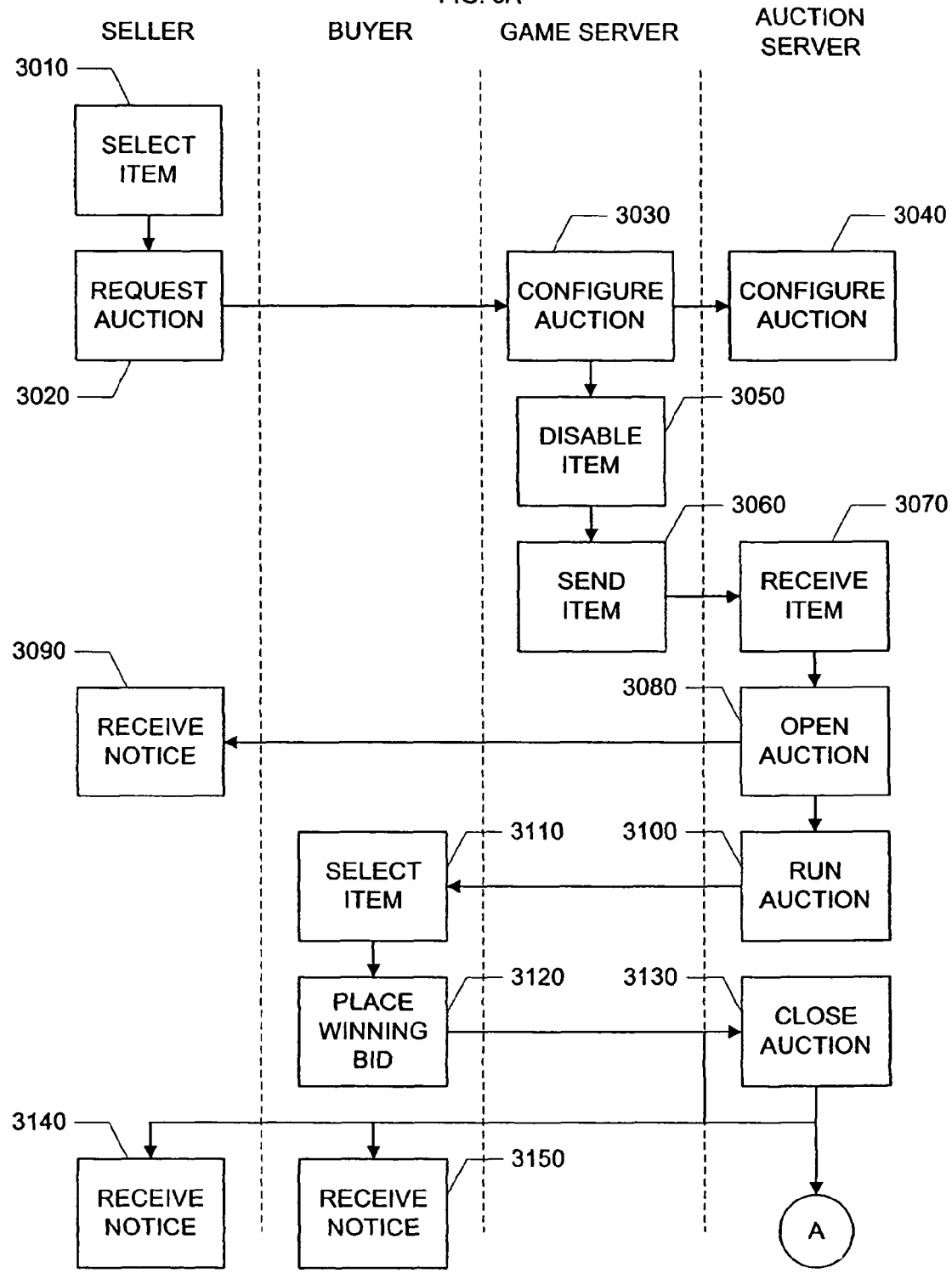

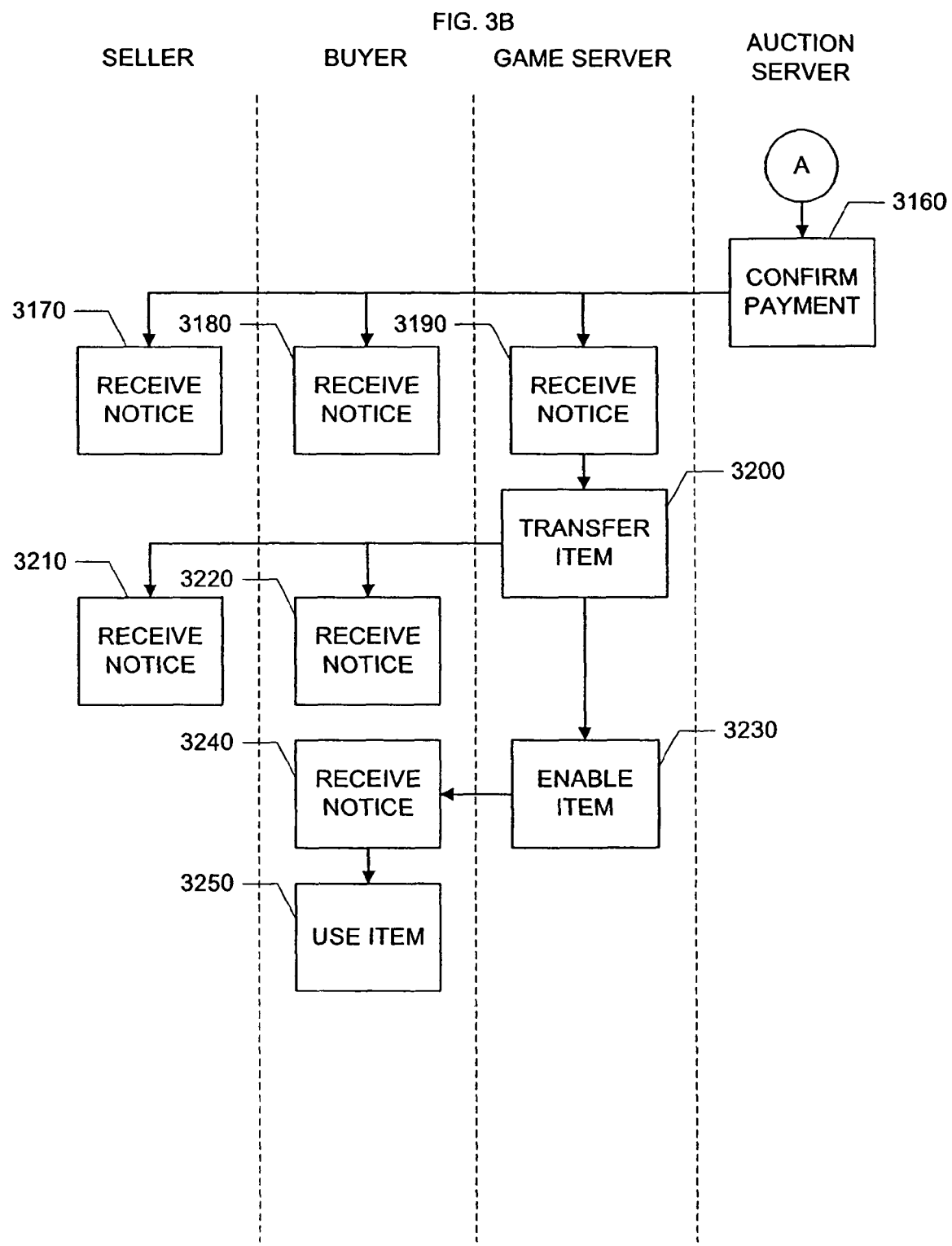

SYSTEM FOR SECURE TRANSFER OF ONLINE PRIVILEGES

CROSS-REFERENCE TO RELATED APPLICATIONS

This application claims the benefit of priority of U.S. Provisional Patent Application Ser. No. 60/673,042 entitled "System for Secure Transfer of Online Privileges", filed Apr. 19, 2005. Benefit of priority of the filing date of Apr. 19, 2005 is hereby claimed, and the disclosure of the Provisional Patent Application is hereby incorporated by reference.

BACKGROUND

Online auctions on the Internet for real-world items have become very popular in the past decade. Many people have enjoyed being able to offer goods to be sold to the very large pool of potential buyers provided by the Internet while others have enjoyed being able to purchase many types of goods from so many potential sellers. Most of the items sold are typical of what might be sold at live auctions, stores, yard sales, and so on. However, as the popularity of online auctions has grown, buyers and sellers have sometimes attempted to sell items that are less ordinary.

Another popular online activity is online gaming, such as through the Internet. Some online games are role-playing games (or RPG's) for very large numbers of players (sometimes called MMOG's, for "massively multiplayer online games," or MMORPG's), such as the Everquest™ games by Sony Online Entertainment, Inc., where a player controls a game persona or character. In the course of the game, a character can acquire various game items, such as money, weapons, equipment, and so on. These game items are represented by data stored for the game, and are not actual physical items (other than the data). When a character has a game item in the game, the game indicates the relationship through the manipulation of data in the game and the character has access to certain privileges associated with that item (e.g., can use an object, wield a weapon, or spend money). Some game items are very rare or difficult to obtain in the game, requiring great skill or effort to acquire. These types of game items can be very desirable for players of the game. Characters in the game can acquire game items from one another, such as by trading one game item for another (e.g., paying game money to buy a game weapon), and so gain access to the privileges of new game items. The game system controls the data representing the characters and the items and so the game controls the transfer of a game item in the game.

At a new nexus of these two areas, some players of online games attempt to sell game items for real money using online auctions, similar to selling ordinary physical items. In this way a player could acquire a game item without having to obtain it in the ordinary course of the game. However, arranging a secure exchange of real money for a game item can be difficult. For example, a player typically does not have control over the data in the game. Similarly, an online auction has no control over the game item data either. While the players may agree to the transfer, an unscrupulous player may try to take advantage by not performing. Hence, it can be difficult for the buyer to ensure that both the buyer (the buyer's character) will actually receive the game item in the game and that the seller will actually receive the money in the real world.

SUMMARY

The present invention provides methods and apparatus for transferring privileges in a computer system. In one implementation, a system for transferring online privileges includes: a game server having a network connection and storing data providing an online game and game environment; a game database connected to said game server, said game database storing data representing one or more game items, data representing a first user game account, and data representing a second user game account, said game item associated with said first user game account; an auction server having a network connection and connected to said game server though said network connections, and storing data providing an online auction for game items; and an auction database connected to said auction server, said auction database storing data representing one or more game items received from said game server, data representing a first user auction account, and data representing a second user auction account.

In another implementation, a method of transferring privileges includes: selecting a game item in an online game provided by a game server, wherein said game item is represented by item data stored in a game database connected to said game server, said item data is associated with a first user account, and said item data has an associated privilege in said online game; retrieving said item data from said game database; transferring auction item data and a first user identifier to an auction server, said auction item data corresponding to said item data and said first user identifier corresponding to said first user account; disabling said item data stored in said game database so that said privilege is not available in said online game; storing said transferred data in an auction database connected to said auction server; presenting an auction for said game item at said auction server; accepting one or more bids at said auction server for said game item; determining a winning bid for said game item from among accepted bids, said winning bid indicating a second user identifier and said second user identifier corresponding to a second user account with said game server; transferring money based on said winning bid from an account indicated by said second user identifier to an account indicated by said first user identifier; updating said item data stored in said game database so that said item data is associated with said second user account; and enabling said item data stored in said game database so that said privilege is available in said online game.

BRIEF DESCRIPTION OF THE DRAWINGS

FIGS. 3A and 3B show a flowchart of one implementation of transferring a privilege by conducting an auction for a game item having that privilege.

DETAILED DESCRIPTION

Figure 1:
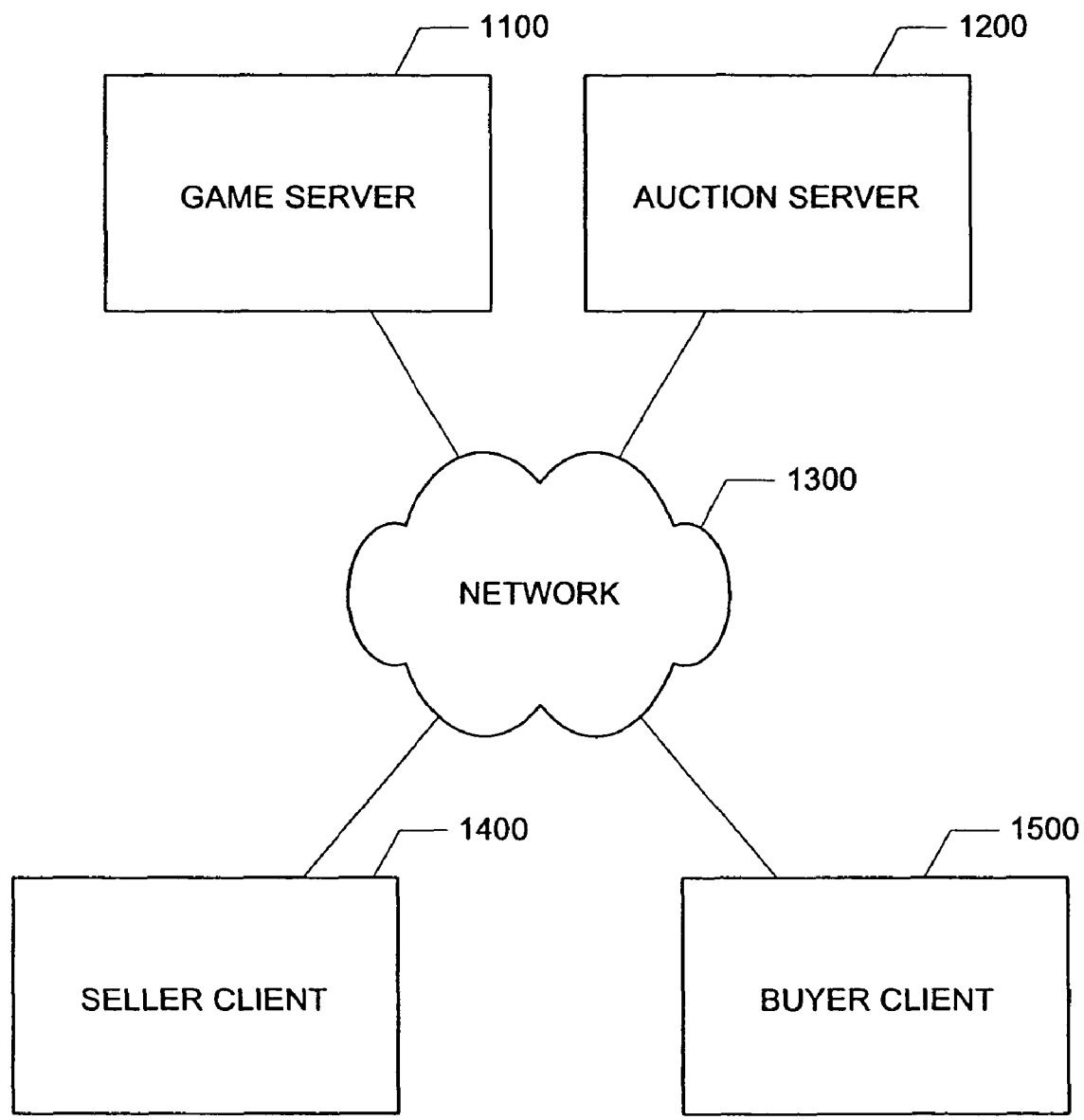
FIG. 1 shows a representation of one implementation of a system for transferring privileges.

The present invention provides methods and apparatus for transferring privileges in one computer system based on a transaction involving a second computer system. In one implementation, an online game system transfers privileges for a game item from a first character to a second character based on an online auction and payment of money from a buyer to a seller.

An illustrative example describing one implementation is presented below. This example is not exhaustive and additional implementations, examples, and variations are also described later.

In one example, an online service company has established an auction system for secure transfers of online privileges. The auction system facilitates the transfer of online privileges for money (e.g., U.S. dollars).

The online company also has established an online game system. A player in the game has control over game items such as characters, objects, money, or locations. The player does not own that data representing items or own any rights in the data or items. The online company allows the player to use the items in the game as part of the game service provided through the game system. A player can place one of these items from the game up for sale in the auction system. The player cannot actually sell the item (it does not exist) and cannot sell the data or any rights (the player does not have any ownership), so the selling player is selling that player's use and control privileges for that item in the online game (as defined by the online company). The online company will disable the privileges from the seller and add the privileges to the account for the purchaser of the item so that the purchaser gains those privileges in the game. For example, a player has acquired 100 gold coins in the game. The player can sell the use of those coins to another player in the auction system. After the transaction, the selling player loses the use of the coins and the purchasing player then can use those coins in the game.

In one example of the operation and interaction of these systems, the game system includes one or more game servers with Internet connections. The game servers operate to provide a game environment to users logged into the system through the Internet. The game servers are connected to one or more databases storing data representing user information and game assets, including data for items for which players can gain online privileges. The auction system includes a server with an Internet connection. The auction system operates to provide an auction service to users logged into the system. The auction system also includes one or more databases storing data representing user information and game assets. The user information includes financial information for a user to accomplish the transfer of money, such as account information with a financial service (e.g., a credit card or PayPal™). The auction system communicates with the game system over a network, such as through a secure connection established over the Internet.

To transfer a privilege, a user that is logged into the game system selects an item in the game and indicates that item is to be auctioned through the auction system. The game system sends a complete copy of data for the selected item to the auction system to be stored in a database of the auction system. The auction system builds an auction profile for the item, including information associating the item with the auctioning user. The game system deletes the data for the item in the game system's database, including the user's privileges for that item in the game. The game system sends a message (e.g., an email) to the user to inform the user that the item is ready for auction in the auction system.

The user logs into the auction system and accesses the auction profile for the transferred item. The user sets desired auction parameters, such as length of the auction, starting price, a reserve price (minimum acceptable price to complete transfer), and an instant purchase price (price that immediately ends auction, higher than the reserve price). The user confirms the user's financial account information and how the user would like to receive payment. When the user is satisfied with the auction setup, the user confirms that the auction is to begin. A listing fee may be charged to the user for placing the item up for bid. If the user will be charged an auction listing fee, the user confirms the charge at this time as well.

When the auction begins, the auction system initiates an auction process allowing users logged into the system to place and review bids for the item. Users of the auction system can log in and browse or search through items placed up for auction. A user can review the information for the item that was sent from the game system and place a bid through the auction system. When a bid is placed by a bidding user, the auction system verifies that the financial information for the bidding user is valid. The auction system also verifies with the game system that the bidding user has a valid account with the game system to receive the item. After verifying the bid, the auction system accepts and records the bid. Other users can then place additional bids. The auction ends when the time period expires or a bid matching the instant purchase price is accepted.

When the auction ends, the auction system determines if the highest accepted bid meets the reserve price (an instant purchase price, if established, is above the reserve price). If the highest accepted bid is at or above the reserve price, the auction is successful and the user that placed the winning bid will receive the purchased privilege—use of the auctioned item in the game. The auction system completes the financial transfer from the purchasing user's account to the auctioning user's account. As soon as the auction system confirms the financial transaction has completed or is approved, the auction system sends a copy of the data for item back to the game system with information indicating the purchasing user, such as the purchasing user's game identification information. The game system restores the item in the game environment and updates the user information of the purchasing user. The game system sends notification messages to the selling user and the purchasing user. When the selling user logs into the game system again, the selling user will not be able to use the item. When the purchasing user logs into the game system again, the purchasing user will be able to use the item.

If the highest accepted bid is below the reserve price, the auction is not successful and the user that placed the item up for auction will retain the privilege—use of the auctioned item in the game. The user can request a new auction and begin the setup process again. If the user decides not to request a new auction, the auction system sends a copy of the data for item back to the game system with information indicating the auctioning user. The game system restores the item in the game environment and updates the user information of the auctioning user. The game system sends an email confirmation notice to the user. When the auctioning user logs into the game system again, the auctioning user will be able to use the item.

In this example, the online company facilitates the transfer of privileges for game items between users. The users are assured that the transfer will occur and that the item in question is what it is purported to be. The online company enhances the game experience for its users and so improves its business.

Referring now to the figures, FIG. 1 shows a representation of one implementation of a system for transferring privileges. A game server 1100 is connected to an auction server 1200 through a network 1300. A seller client 1400 and a buyer client 1500 are also connected to the network 1300.

The game server 1100 is a network server system including computer hardware and software to support the operation of and storage for an online game environment and game play, such as that used to support MMORPG's. The game server 1100 supports one or more online games and provides an interface to each game for clients connected to the game server 1100 through the network 1300. The game server 1100 stores data representing game environments and game items, and data for user accounts. A player of a game has a corresponding user account stored on the game server 1100 (or multiple accounts).

The auction server 1200 is a network server system including computer hardware and software to support the operation of and storage for an online auction service, such as that used to support online auctions. The auction server 1200 supports auctions for buyers and sellers and provides an interface to the auctions for clients connected to the auction server 1200 through the network 1300. The auction server 1200 stores data representing the auctions and items being auctioned, and data for user accounts. A buyer or seller has a corresponding user account stored on the auction server 1200 (or multiple accounts).

The network 1300 is a computer network, such as the Internet, providing direct and/or indirect network connections between devices connected to the network 1300. In other implementations, different or additional networks can be used, such as a phone network or a private network.

The seller client 1400 is a computer system, such as a desktop or laptop computer, or a game console. The seller client 1400 stores and executes client software to interact with the game server 1100 and the auction server 1200. Game client software supports playing an online game provided by the game server 1100. Auction client software supports requesting and participating in online auctions provided by the auction server 1200. In one implementation, the game client software and the auction client software are integrated into one application program or application suite. The buyer client 1500 is a computer system similar to the seller client 1400. In another implementation, one (or both) of the clients is a different type of computer system, such as a portable device (e.g., a PDA or portable game device) or mobile phone including appropriate client software (e.g., a limited version of the regular game client software so that a subset of game features can be accessed). In one such implementation, the game server and auction server provide different levels of access to different types of client systems.

The configuration and relationship of the game server and auction server are flexible and can vary in different implementations. In one implementation, the game server and the auction server are parts of the same system, or share some components (e.g., share storage, but have separate network interfaces). In one such implementation, the game server operates an auction for players in the game and the auction server provides an interface to that auction for users outside the game. In another implementation, the game server and auction server are operated by different companies. In one such implementation, one company operates a game server and the auction server and a second company operates a different game server for a different game. In this situation, the auction server can support auctions for game items from either game.

Figure 2:
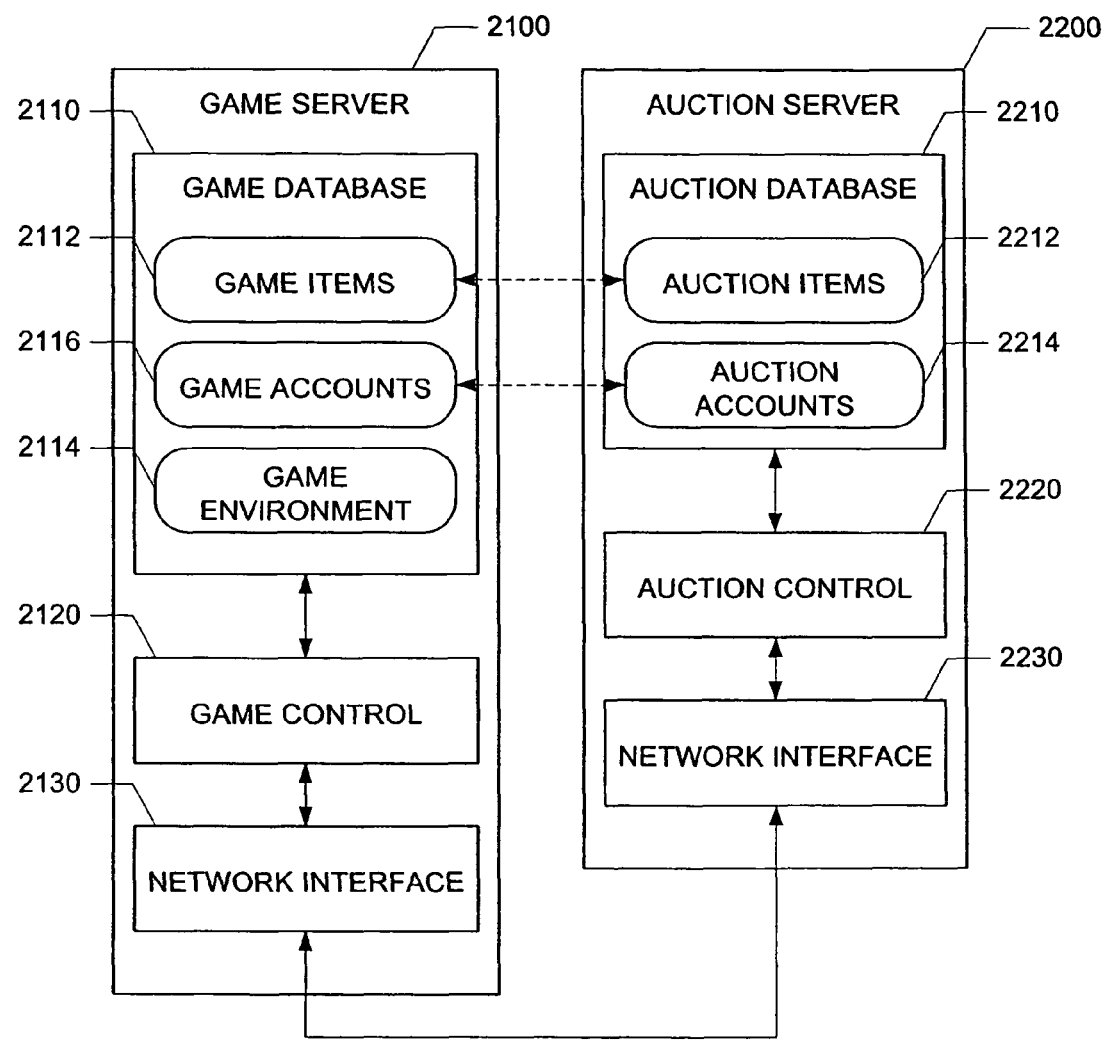
FIG. 2 shows a block diagram of one implementation of a game server and an auction server.

FIG. 2 shows a block diagram of one implementation of a game server 2100 and an auction server 2200. The game server 2100 is a network computer system and includes a game database 2110, a game control system 2120, and a network interface 2130. Alternatively, the game database can be external. The auction server 2200 is a network computer system and includes an auction database 2210, an auction control system 2220, and a network interface 2230. Alternatively, the auction database can be external. In another implementation, either or both servers include multiple server systems (e.g., to distribute processing and storage for load balancing). Both servers 2100, 2200 include additional hardware and software typical of computer server systems (e.g., power and a user interface), though these components are not specifically shown in FIG. 2 for simplicity. In another implementation, the servers share components (e.g., using a common database).

In the game server 2100, the game database 2110 is a storage system, such as one or more hard drives (e.g., a RAID system). The game database 2110 stores data used in and for an online game (or for multiple games). Some of the data represents game items 2112 that are assets available as part of the game, such as characters, objects, places, and so on. A game item has one or more privileges and the data for a game item indicates any privileges associated with that game item. The privileges of an item are the functions or operations allowed by possessing that item. For example, a weapon game item has defined characteristics (e.g., amount of damage inflicted). A coin or money game item has a value in the game economy and can be spent or traded (e.g., 100 coins can buy a loaf of bread), though that value may fluctuate. The data for a character game item indicates what other game items are possessed by the character in the game (e.g., what equipment the character has). When a character has a game item in the game, the character has access to the privileges associated with that game item (possibly subject to other game conditions). In another implementation, game items include abstract items, such as memberships, levels of membership, titles, or names. In another implementation, game items have subsets of features or privileges that can be divided (e.g., rooms in a house). The data for a game item also includes an identifier for the item. In one implementation the data for a game item includes a key or digital signature to verify that the data is data from the game server (e.g., when the data for the game item is passed back and forth with the auction server).

Game items can be acquired or traded within the game by characters. Alternatively, players outside the game environment can trade items using the game server (e.g., in a defined player interface for player-to-player interaction). In one implementation, users do not own the game items; they merely have limited rights to use the game items in accordance with a license agreement (which may or may not incorporate other rules) promulgated by the owner of the online game. In another implementation, users may own some or all of the game items.

Some data also represents the game environment 2114, such as video and audio data to present the game items 2112 and game locations (some of which may be game items), and data used to implement the game (e.g., state information and physics information). Some data represents user game accounts 2116 for users registered with the game server 2100, such as identifier, name, security information, billing information, financial account information (e.g., banking, credit card, online funds transfer such as PayPal™), and game items 2112 associated with the game account 2116.

The game control system 2120 controls the operation of the online game supported by the game server 2100. In one implementation, the game control system 2120 is integrated with the general control system for the game server 2100 that controls the operation of the game server 2100 (not shown in FIG. 2). The game control system 2120 includes hardware and software to store and execute the game software providing the online game. The control system 2120 accesses and modifies the data stored in the game database 2110 in the course of executing the game software.

The network interface 2130 in the game server 2100 provides one or more connections to a network (e.g., the Internet) to connect the game server 2100 to other servers (e.g., the auction server 2200 or financial servers) and to clients (e.g., client systems playing the online game).

In the auction server 2200, the auction database 2210 is a storage system, such as one or more hard drives (e.g., a RAID system). The auction database 2210 stores data used in and for an online auction (or for multiple auctions). Some of the data represents auction items 2212 that are up for sale in an auction, such as physical objects or services, and game items 2112 from the game server 2100. Some data represents user auction accounts 2214 for users registered with the auction server 2200, such as identifier, name, security information, billing information, financial account information (e.g., banking, credit card, online funds transfer such as PayPal™), and auction items 2212 associated with the auction account 2214.

The auction control system 2220 controls the operation of the online auction supported by the auction server 2200. In one implementation, the auction control system 2220 is integrated with the general control system for the auction server 2200 that controls the operation of the auction server 2200 (not shown in FIG. 2). The auction control system 2220 includes hardware and software to store and execute the auction software providing the online auction. The control system 2220 accesses and modifies the data stored in the auction database 2210 in the course of executing the auction software.

The network interface 2230 in the auction server 2200 provides one or more connections to a network (e.g., the Internet) to connect the auction server 2200 to other servers (e.g., the game server 2100 or financial servers) and to clients (e.g., client systems reviewing or participating in auctions).

The game server 2100 and the auction server 2200 communicate by exchanging data through their network interfaces 2130, 2230. As described below, in the course of an auction for a game item, data for the game item and data for the game account associated with the game item is transferred back and forth between the two servers 2100, 2200, represented by the dashed lines in FIG. 2.

FIGS. 3A and 3B show a flowchart of one implementation of transferring a privilege by conducting an auction for a game item having that privilege. In FIGS. 3A and 3B, various actions and events are represented by labeled blocks, described below. In addition, the blocks are positioned in columns to reflect which party is taking the action. Initially, a game server is providing an online game and has stored data representing various game items and privileges associated with the game items. Game users can connect to and interact with the game server through the Internet using game client software. A first user (the "seller") is executing game client software on a computer system and has established a network connection between the computer system and the game server. The seller has a game account with the game server and is playing the online game using that account. The game account has associated with it multiple game items (e.g., characters controlled by the seller and game items possessed by those characters in the game). The seller has decided to auction one of the seller's game items through the auction server. The auction server is providing an online auction service through a website. Auction users can connect to and interact with the auction server over a network, such as through the Internet using a web browser. In another implementation, the game server provides an auction interface, either in the game or outside the game, accessible through the game client software. The game server auction interface can also be accessible through other network software, such as a web browser (e.g., allowing players in the game and non-players to participate in the auction; or allowing partial access to the auction through a web browser, so that a player can view the auction but not bid while outside the game).

The seller selects a game item to auction through the seller's computer system, block 3010, and requests an auction for the selected game item, block 3020. The game server selects the indicated item and confirms that the game item is associated with the seller's game account. The game server does not permit the seller to auction game items that are not associated with the seller's game account and rejects such requests. The seller makes the selection and request from inside the game (that is, while playing the game), such as by having the character enter an auction house in the game and present an item to an auctioneer. Alternatively, the seller can use an auction interface provided by the game server that operates outside of the game (e.g., similar to a login interface) or indirectly through an interface provided by the auction server. In another implementation, the seller can select a subset of privileges or partial use of a game item as the subject of an auction. For example, a seller may select to rent out a room of a house or auction the use of a weapon for one month.

After confirming the auction request, the game server negotiates auction parameters with the seller, block 3030. The auction parameters indicate how the auction is to be performed, such as auction form, starting price, reserve price, time limit, etc. Once the seller confirms the auction parameters, the game server provides the auction parameters to the auction server and the auction server begins setting up the auction, block 3040. The auction server confirms that the seller has an account with the auction server (or creates one if not) and associates the auction with that account. The auction server builds an announcement for the auction so that users of the auction server can be informed.

The game server then retrieves or accesses the data for the game item and disables the selected game item, block 3050. Once a seller places an item up for auction, the seller no longer has access to the privileges of the item, unless the auction fails. In one implementation, that game item is removed from the game (destroyed) and the data for the game item is stored in a separate location (or no longer associated with the seller's character or user account; the game server maintains information indicated from which seller a game item was taken to be able to return the item if the auction fails). In another implementation, the game item is disabled so that it can no longer be used in the game (e.g., using a flag or list), but the item is not removed from the game.

The game server sends a copy of the data for the game item to the auction server, block 3060, and the auction server receives and stores the data, block 3070. The game server sends an identifier with the data for the game item to identify the auction account of the seller (or to identify the seller to the auction server so the auction server will find the seller's auction account). In one implementation, the game server uses a secure connection to transfer the data to the auction server. In another implementation, the game server encrypts some or all of the game item data using a key before sending the data (e.g., to prevent the data from being altered while outside the game server). In another implementation, the game server sends only part of the data for a game item to the auction server, or sends a reference to the data stored by the game server (e.g., a pointer or index; convenient when the game server and auction server share storage). The auction server associates the data for the game item with the auction information previously received. In another implementation, the game server sends the auction parameters and information to the auction server with the data for the game item instead of separately.

The auction server opens and presents the auction according to the received parameters, block 3080. If there is a specific opening time requested, the auction opens at that time. The auction server can have additional parameters set by the auction server on how to run the auction (e.g., minimum bid increment, how to end the auction, extending the auction time limit when bids are received near the end of the time limit). The auction server sends a notification to the seller that the auction is now open, block 3090. In one implementation, the auction server sends an email message to the seller. In other implementations, different or additional notification modes can be used, such as instant messaging, an in-game message from the game server, a pop-up dialog, and so on.

The auction server proceeds to run the auction according to the auction parameters, block 3100. The auction server provides information to reviewing auction users and reviews and accepts bids as they are presented. In one implementation, the auction server requires a confirmation of available funds before accepting a bid.

A second user (the "buyer") opens a connection to the auction server and selects the game item up for auction, block 3110. The buyer is executing a web browser on a computer system and has established a network connection between the computer system and the auction server. The buyer has an auction account with the auction server and is interested in buying the selected item. The buyer also has a game account with the game server (if the buyer does not have a game account and does not create one, the auction server will retain the data for the game item in the buyer's auction account; the buyer could then re-auction the game item, such as to another player of the game). The buyer places a bid that the auction server accepts and determines is the winning bid for the game item, block 3120. The auction server accepts the winning bid and closes the auction, block 3130. The auction server determines that the buyer's bid is the winning bid according to the auction parameters (e.g., the buyer's bid is submitted before the end of the auction, the bid is higher than a set reserve price, and the bid is the highest bid made during the auction). The auction server notifies the seller that the auction is closed, block 3140. In one implementation, the auction server also informs the seller of the buyer's identity. The auction server notifies the buyer that the auction is closed and that the buyer has placed the winning bid, block 3150.

After closing the auction, the auction server confirms payment from the buyer to the seller, block 3160. In one implementation, the auction server facilitates a transfer of funds (e.g., in U.S. dollars) from the buyer to the seller (e.g., by providing appropriate information to an online funds transfer system, such as PayPal™). In another implementation, the auction server uses the auction accounts to store financial information, such as credit card and banking information, to cause a transfer of money or direct payment. In another implementation, the auction server credits and debits balances of the seller's and buyer's auction accounts or provides the information to the game server so the game server can credit and debit balances of the seller's and buyer's game accounts (e.g., to be applied against fees for using the online game or for additional services provided by the game server, such as enhanced privileges or storage). In another implementation, the payment is made in game currency for the game provided by the game server and so the game server confirms the "payment" (e.g., the auction server is acting as an out-of-game auction site or second interface to auctions for the in-game economy, or a player can sell game items to the operator of the game server for real money). In another implementation, the auction server deducts a service fee from the payment and retains that fee.

If the payment is confirmed, the auction server notifies the seller, block 3170, the buyer, block 3180, and the game server, block 3190, that the auction succeeded and that payment has been confirmed. The seller receives the agreed upon money from the buyer through the appropriate mechanism (as described above). The auction server sends the buyer's identifier back to the game server with the confirmation to confirm which auction succeeded. The auction server also sends an identifier to the game server to identify the game account of the buyer (or to identify the buyer to the game server so the game server will find the buyer's auction account). In another implementation, the auction server checks with the game server whether the buyer is allowed to receive the game item (e.g., the buyer does not have a game account, or receiving a new character game item would exceed the number of characters the buyer is allowed to have) before confirming the auction has succeeded.

If the payment is not confirmed (e.g., insufficient funds), the auction server determines that the auction has failed and notifies the seller, buyer, and game server that the auction failed and that no payment will occur. In this case, the game server will return the game item to the seller in the game or offer the seller the option of setting up a new auction. In one implementation, the auction server sends the data for the game item back to the game server and the game server confirms that the data is unchanged (e.g., by checking for a key or signature or by decrypting the data).

When the game server receives confirmation from the auction server that the auction has succeeded, the game server transfers the game item from the seller's game account to the buyer's game account, block 3200. The game server updates the data for the game item to reflect the transfer to the new account (if that information is stored with item data as well). The game server notifies the seller, block 3210, and the buyer, block 3220, of the item transfer. The game server moves the data for the auctioned game item to the game account of the buyer (or moves the appropriate identifier or reference). The game server enables the game item for the buyer, block 3230, and notifies the buyer that the item is enabled and ready for use in the game, block 3240. The game server enables the game item by reversing the process of disabling described above (e.g., adjusting an enable/disable flag). When the buyer returns to the game, the buyer can use the game item and its privileges in the game, block 3250. The buyer can select the new game item and specify how to use it (e.g., which character will use an item of equipment).

The sequence shown in FIGS. 3A and 3B is one example of the process. In other implementations, different sequences can be used, such as completing the financial transaction after transferring the game item data, or revoking the transfer of game data from one game account to another if the payment later fails. In another example, notifications separated in FIGS. 3A and 3B can be combined.

In another implementation, the auction server provides a recommendation service or "wish list" for players. A player registers with the recommendation service and indicates one or more preferences. The preferences indicate a game and types of game items (or specific game items) that the player is interested in acquiring in the game. The auction server periodically checks whether an auction is open or going to open for a game item matching the supplied preferences. In another implementation, the auction server maintains a list of items up for auction and periodically checks that list. Alternatively, when a new item is up for auction, the auction server checks the preferences of players registered with the recommendation service. In another implementation, the auction server automatically generates preferences for registered players (or all players) based on the game items associated with the players' accounts (e.g., by querying the game server for player information). For example, if a player has a particular type of character in the game and that character can only use certain types of equipment, the auction server can build preferences to recommend items for auction that are usable by the character and that are more powerful (in game attributes) than those already held by the character. In another implementation, the game server provides the recommendation service instead of the auction server (or in addition to or in conjunction with the auction server). For example, the game server periodically polls the auction server for matches based on preferences received by the game server.

The various implementations of the invention are realized in electronic hardware, computer software, or combinations of these technologies. Some implementations include one or more computer programs executed by a programmable processor or computer. For example, referring to FIG. 1, in one implementation, the game server and the auction server each include one or more programmable processors. In general, each computer includes one or more processors, one or more data-storage components (e.g., volatile or non-volatile memory modules and persistent optical and magnetic storage devices, such as hard and floppy disk drives, CD-ROM drives, and magnetic tape drives), one or more input devices (e.g., mice and keyboards), and one or more output devices (e.g., display consoles and printers).

The computer programs include executable code that is usually stored in a persistent storage medium and then copied into memory at run-time. The processor executes the code by retrieving program instructions from memory in a prescribed order. When executing the program code, the computer receives data from the input and/or storage devices, performs operations on the data, and then delivers the resulting data to the output and/or storage devices.

Various illustrative implementations of the present invention have been described. However, one of ordinary skill in the art will see that additional implementations are also possible and within the scope of the present invention. For example, while the above description focuses on implementations for auctions for game items, the auctions can also be used for the transfer of privileges associated with other types of data, such as shopping privileges, or access to audio or video data. Similarly, the auctions can be presented as in-game or out-of-game services, or a combination. The auction can be replaced with a simple sale system, where a set price is used rather than bidding. Alternative system configurations can also be used, such as distributed processing or storage systems.

Accordingly, the present invention is not limited to only those implementations described above.

What is claimed is:

1. A system for transferring online privileges for one or more game items from a first user to a second user, comprising:
    an online game provider company configured to provide an online game;
    a game server having a network connection and storing data providing the online game and game environment, wherein said online game provider company has control over said game server;
    a game database connected to said game server, said game database storing data representing said one or more game items,
    data representing a game account of the first user, and
    data representing a game account of the second user,
    said one or more game items associated with said first user game account;
    an auction server having a network connection and connected to said game server through the network connection, and storing data providing an online auction for said one or more game items, wherein said online game provider company has control over said game server; and
    an auction database connected to said auction server, said auction database storing
    data representing said one or more game items received from said game server,
    data representing an auction account of the first user, and
    data representing an auction account of the second user,
    wherein said data representing said one or more game items to be auctioned and stored in said auction database is encrypted using a key included in a game item of said one or more game items stored in said game server to verify that the data is data from the game server,
    wherein said game server disables said one or more game items associated with said first user game account and associates said one or more game items with said second user game account when said auction server verifies that a financial transfer has been made from the second user auction account to the first user auction account, and
    wherein said online game provider company has control over both said game server and said auction server so that the second user is assured of transfer of said one or more game items.

2. The system of claim 1, wherein: said game database and said auction database are parts of a combined database.

3. The system of claim 1, wherein: said game server and said auction server are two server interfaces for the same online system.

4. The system of claim 1, wherein: said game server and said auction server are software interfaces for one online system.

5. The system of claim 1, wherein: said auction database stores data identifying said first user game account and data identifying said second user game account.

6. A method of transferring privileges for one or more game items from a first user to a second user, comprising:
    selecting a game item in an online game provided by an online game provider company,
    wherein said game item is represented by item data stored in a game database connected to a game server, said item data is associated with an account of the first user, and said item data has an associated privilege in said online game;
    retrieving said item data from said game database;
    encrypting an auction item data stored in an auction server using a key included in the game item stored in said game server to verify that the data is data from the game server;
    transferring said auction item data and an identifier of the first user to said auction server, said auction item data corresponding to said item data and said first user identifier corresponding to said first user account;
    disabling said item data stored in said game database so that said privilege is not available in said online game;
    storing said transferred data in an auction database connected to said auction server;
    presenting an auction for said game item at said auction server;
    accepting one or more bids at said auction server for said game item;
    determining a winning bid for said game item from among accepted bids, said winning bid indicating an identifier of the second user and said second user identifier corresponding to an account of the second user with said game server;

transferring money based on said winning bid from an account indicated by said second user identifier to an account indicated by said first user identifier;

updating said item data stored in said game database so that said item data is associated with said second user account; and enabling said item data stored in said game database so that said privilege is available in said online game, wherein the second user is assured of transfer of the game item since said online game provider company has control over both said game server and said auction server.

7. The method of claim 6, further comprising:
transferring said auction item data and said second user identifier to said game server;
verifying said auction item data transferred to said game server.

8. The method of claim 6, wherein: transferring money includes requesting and confirming transferring funds through a third party financial service.

9. The method of claim 6, wherein: said auction item data is a copy of said item data.

10. The method of claim 6, wherein: said auction item data is a reference to said item data.

11. A system for transferring online privileges for one or more game items from a first user to a second user, comprising:

an online company configured to provide an online service;

a first server having a network connection and storing data providing the online service, wherein said online company has control over said first server;

a first database connected to said first server, said first database storing data representing one or more items, data representing a game account of the first user, and data representing a game account of the second user, said item associated with said first user game account;

an auction server having a network connection and connected to said first server through said network connections, and storing data providing an online auction for items from said first server, wherein said online company has control over said auction server; and an auction database connected to said auction server, said auction database storing data representing one or more items received from said first server, data representing an auction account of the first user, and data representing an auction account of the second user, wherein said data representing one or more items to be auctioned and stored in said auction database is encrypted using a key included in an item of said one or more items stored in said first server to verify that the data is data from the first server, and wherein said online company has control over both said first server and said auction server so that the second user is assured of transfer of said one or more items.

12. A computer program, stored on a tangible storage medium, for use in transferring privileges for one or more game items from a first user to a second user, the program comprising executable instructions that cause a computer to:

select a game item in an online game provided by an online game provider company, wherein said game item is represented by item data stored in a game database connected to a game server, said item data is associated with an account of the first user, and said item data has an associated privilege in said online game;

retrieve said item data from said game database;

transfer auction item data and an identifier of the first user to an auction server, said auction item data corresponding to said item data and said first user identifier corresponding to said first user account, wherein said auction item data stored in said auction server is encrypted using a key included in the game item stored in said game server to verify that the data is data from the game server;

disable said item data stored in said game database so that said privilege is not available in said online game;

confirm the completion of a transfer of money based on the completion of an auction by said auction server, identified by said first user identifier;

update said item data stored in said game database so that said item data is associated with an account of the second user identified by an identifier of the second user received from said auction server; and enable said item data stored in said game database so that said privilege is available in said online game, wherein the second user is assured of transfer of said item data since said online game provider company has control over both said game server and said auction server.

13. A computer program, stored on a tangible storage medium, for use in transferring privileges for one or more game items from a first user to a second user, the program comprising executable instructions that cause a computer to:

store game item data and an identifier of the first user received from a game server, said first user identifier corresponding to an account of the first user with said game server, and said game item data having an associated privilege in an online game provided by said game server, which is controlled by an online game provider company, wherein said game item data received from said game server is encrypted using a key included in the game item data stored in said game server to verify that the data is data from the game server;

present said game item for an auction on an auction server controlled by the online game provider company;

accept one or more bids for said game item;

determine a winning bid for said game item from among accepted bids, said winning bid indicating an identifier of the second user and said second user identifier corresponding to an account of the second user with said game server;

confirm the transfer of money based on said winning bid from an account indicated by said second user identifier to an account indicated by said first user identifier;

send a confirmation to said game server indicating the completion of said auction and that said privilege is to be transferred from said first user account to said second user account, wherein the second user is assured of transfer of said game item since said online game provider company has control over both said game server and said auction server.

14. A system for transferring privileges for one or more game items from a first user to a second user, comprising:

means for selecting a game item in an online game provided by an online game provider company, wherein said game item is represented by item data stored in a game database connected to a game server, said item data is associated with an account of the first user, and said item data has an associated privilege in said online game;

means for retrieving said item data from said game database;

means for transferring auction item data and an identifier of the first user to an auction server, said auction item data corresponding to said item data and said first user identifier corresponding to said first user account,
wherein said auction item data stored in said auction server is encrypted using a key included in the game item stored in said game server to verify that the data is data from the game server;
means for disabling said item data stored in said game database so that said privilege is not available in said online game;
means for storing said transferred data in an auction database connected to said auction server;
means for presenting an auction for said game item at said auction server;
means for accepting one or more bids at said auction server for said game item;
means for determining a winning bid for said game item from among accepted bids, said winning bid indicating an identifier of the second user and said second user identifier corresponding to an account of the second user with said game server;
means for transferring money based on said winning bid from an account indicated by said second user identifier to an account indicated by said first user identifier;
means for updating said item data stored in said game database so that said item data is associated with said second user account; and
means for enabling said item data stored in said game database so that said privilege is available in said online game,
wherein the second user is assured of transfer of said item data since said online game provider company has control over both said game server and said auction server.

* * * * *